(12) United States Patent
Hazenbroek et al.

(10) Patent No.: US 6,656,032 B2
(45) Date of Patent: Dec. 2, 2003

(54) LEG PART CUTTER

(75) Inventors: Jacobus Eliza Hazenbroek, Klasswaal (NL); Hendrik De Bonte, Sommelsdijk (NL)

(73) Assignee: Systemate Group, B.V., Numansdorp (NL)

( * ) Notice: Subject to any disclaimer, the term of this patent is extended or adjusted under 35 U.S.C. 154(b) by 26 days.

(21) Appl. No.: 09/788,775

(22) Filed: Feb. 20, 2001

(65) Prior Publication Data

US 2001/0023171 A1 Sep. 20, 2001

(30) Foreign Application Priority Data

Feb. 23, 2000 (NL) .............................................. 1014469

(51) Int. Cl.$^7$ .............................................. A22C 17/12
(52) U.S. Cl. .................... 452/125; 452/149; 452/135
(58) Field of Search ........................... 452/160, 94, 95, 452/88, 89, 97, 98, 99, 125, 127, 135, 138, 139, 149, 162, 163, 166, 169, 170

(56) References Cited

U.S. PATENT DOCUMENTS

| 4,102,015 A | | 7/1978 | Herrick .......................... 17/11 |
| 4,561,150 A | * | 12/1985 | Townsend ....................... 17/50 |
| 4,610,051 A | | 9/1986 | Martin et al. ................... 17/11 |
| 4,644,608 A | * | 2/1987 | Martin et al. ................... 17/46 |
| 4,993,115 A | * | 2/1991 | Hazenbroek ................. 452/169 |
| 5,147,240 A | * | 9/1992 | Hazenbroek et al. ........ 452/163 |
| 5,194,035 A | * | 3/1993 | Dillard ........................ 452/165 |
| 5,266,064 A | | 11/1993 | Gagliardi, Jr. .............. 452/135 |
| 5,272,946 A | * | 12/1993 | McCullough et al. ........ 452/127 |
| 5,288,264 A | * | 2/1994 | Braeger ....................... 452/127 |
| 5,338,250 A | * | 8/1994 | Swilley et al. ............... 452/136 |
| 5,429,548 A | * | 7/1995 | Long et al. ................... 452/127 |
| 5,429,549 A | * | 7/1995 | Verrijp et al. ................ 452/169 |
| 5,558,573 A | * | 9/1996 | Brasile, II. et al. ......... 452/127 |
| 5,833,527 A | * | 11/1998 | Hazenbroek et al. ........ 452/170 |

FOREIGN PATENT DOCUMENTS

| DE | 249 842 A1 | 6/1986 |
| EP | 0 519 570 A1 | 6/1992 |

* cited by examiner

Primary Examiner—Peter M. Poon
Assistant Examiner—Joan M. Olszewski
(74) Attorney, Agent, or Firm—Thomas, Kayden, Horstemeyer & Risle

(57) ABSTRACT

A leg part cutter (1) skins and cuts poultry leg parts, in particular thighbones (P), which parts are provided with a bone. A frame (2, 3) and skinning rolls (19) arranged on the frame for skinning the leg part. Knives (24, 25) are arranged on the frame for cutting through the leg part along the bone. A conveyor (4) conveys the leg part past the skinning rolls and after that past the knives.

20 Claims, 3 Drawing Sheets

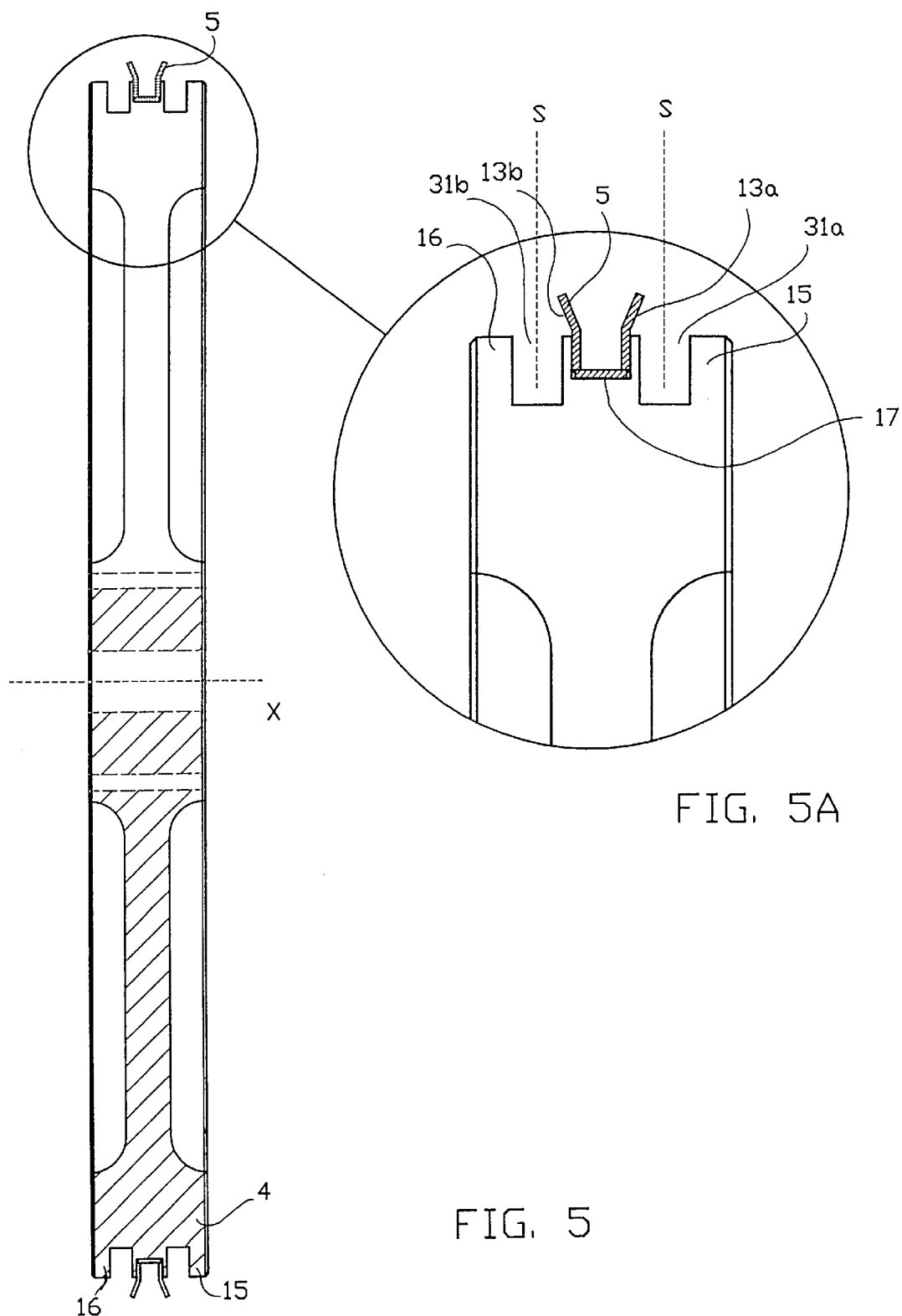

LEG PART CUTTER

The invention relates to a device for cutting meat from leg parts, in particular thighbones, of poultry, which portions are provided with a bone.

It is known to manually cut meat from chicken's thighbones. The workman here takes a thighbone in his hand and lays it on a cutting table. There, holding the thighbone, he removes the skin while holding a knife in the other hand. After that, still holding the thighbone, he first makes a longitudinal incision, more or less parallel to the bone, with the knife, at the one side of his other hand, and subsequently a second longitudinal incision at the other side of said hand. Two filet pieces of meat have then been obtained, leaving a bone with meat residues, also called spare-rib.

A drawback of said method is that it is laborious. Another drawback is that there is a good chance of injuries, because the thighbone has to be held during cutting and for reasons of efficiency the incisions have to be made as close along the bone as possible.

An object of the invention is to improve on this.

To that end the invention provides in a device for skinning and cutting leg parts, in particular thighbones, of poultry, which portions are provided with a bone, comprising a frame and means arranged on the frame for skinning the leg part, as well as means arranged on the frame for cutting through the leg part along the bone, in which the device furthermore comprises means for conveying the leg part past the skinning means and after that past the cutting means.

In this way a device is provided with which the leg parts are skinned and cut automatically, so that there no longer is a danger of injuries. Moreover the various treatments can be carried out simultaneously to subsequent leg parts, so that the performance is increased.

Preferably the conveying means comprise a toothed revolving driven endless belt or ring, preferably provided with a double row of teeth. The leg parts are positively conveyed by the teeth to the subsequent treatment locations and conveyed past them.

Preferably the teeth of both rows of teeth are inclined and facing away from each other for optimal grip on the leg parts.

A very compact arrangement is obtained when the circular path is substantially situated in a vertical plane.

A simple and compact design of the device according to the invention is obtained when the toothed ring or toothed belt follows a substantially circular path.

The safety of the operator of the device is further increased when at least over a part of the circumference of the toothed ring or toothed belt a hood has been arranged, which forms a tunnel for the leg part.

The safety is further increased when the device furthermore comprises means for deactivating the conveying means when contacting a hand. Said means preferably are situated at the beginning of a tunnel, at the end of the track where the leg parts are placed on the device.

Preferably the cutting means comprise two knives positioned on either side of the conveying means for cutting off the meat along the bone.

Preferably the knives are arranged for adjustment of their distance one to the other in a direction transverse to the movement path of the leg parts, so that adjustment can take place to the size of the leg part to be cut.

Preferably, each knife is provided with its own drive, so that the adjustment of the mutual distance can take place easily.

When the cutting means are situated at the bottom, in case of a vertical arrangement of the device, the free space below the conveying means can be used when separating cut-off pieces of meat that can be very big.

In an advantageous manner a retaining means is arranged downstream of the cutting means, for converting the horizontal ejection direction of the cut-off pieces of meat into a falling direction.

Preferably the skinning means are situated above the cutting means and below a placement track. Thus optimal use is made of gravity during the treatment process.

The device is furthermore provided with means for guiding the bone after cutting to a location of discharge at a distance from the cutting means.

The invention will be elucidated on the basis of the exemplary embodiment shown in the attached drawings, in which.

Figure 3:
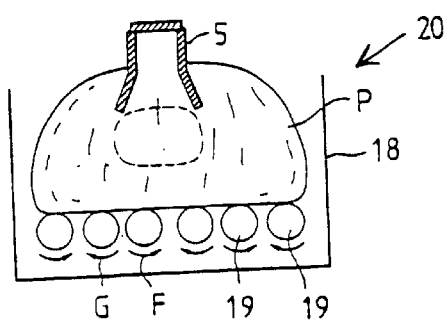
Figure 1:
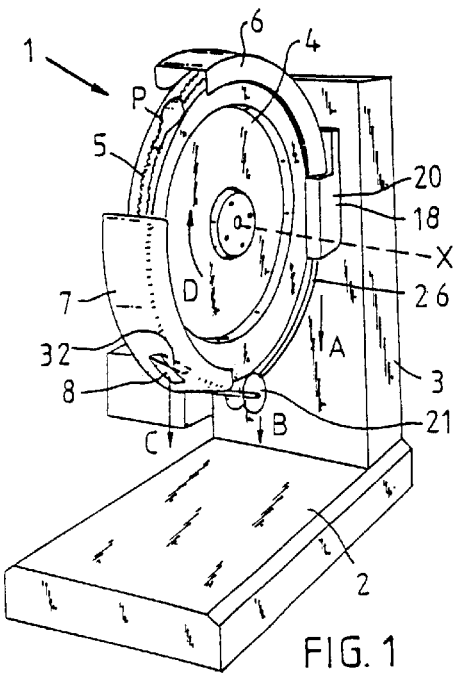
FIG. 1 shows a view in perspective on a device according to the invention.
Figure 4C:
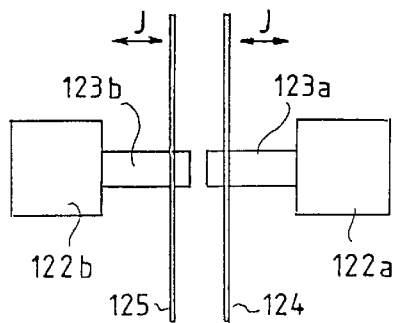
Figure 4B:
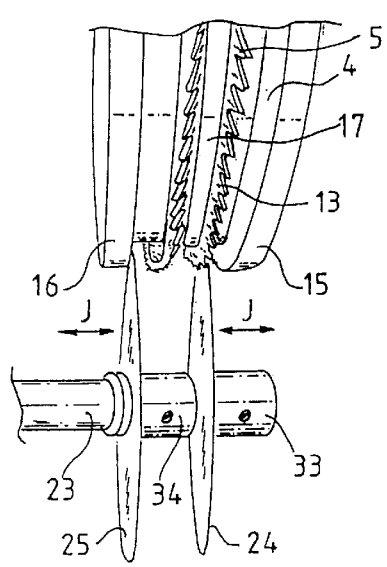
Figure 4A:
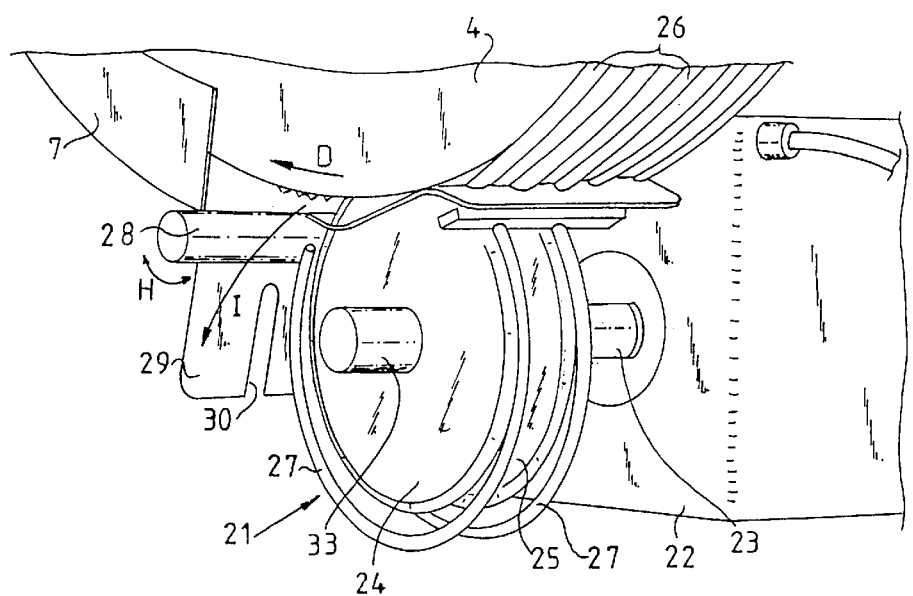

FIG. 3 schematically shows a cross-section at the location of the skinning station of the device of FIG. 1;

FIGS. 4A and 4B show views on the cutting station of the device of FIG. 1;

FIG. 4C shows a diagram of an alternative arrangement of the cutting knives of the cutting station; and FIGS. 5 and 5A, respectively, show a cross-section and a detail of the conveying disc in the device of FIG. 1.

Figure 6:
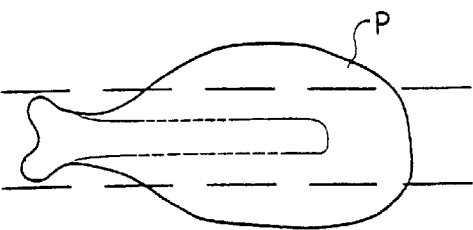

FIG. 6 is a schematic illustration of a leg part of poultry, showing in dash lines the cuts made by the cutting disks.

The device 1 of FIG. 1 comprises a frame 2, 3 having a base plate 2 and a column 3, on which a circular disc 4 has been mounted vertically—through means that are not shown-. By means of an electro motor that is not shown the disc is rotated in the direction D, about the centre line X. On the circumference of the disc 4 (also see FIG. 5, 5A) a toothed steel profiling 5 has been arranged with which leg parts P, in particular chicken's thighbones, are transported along in the direction D.

Figure 2:
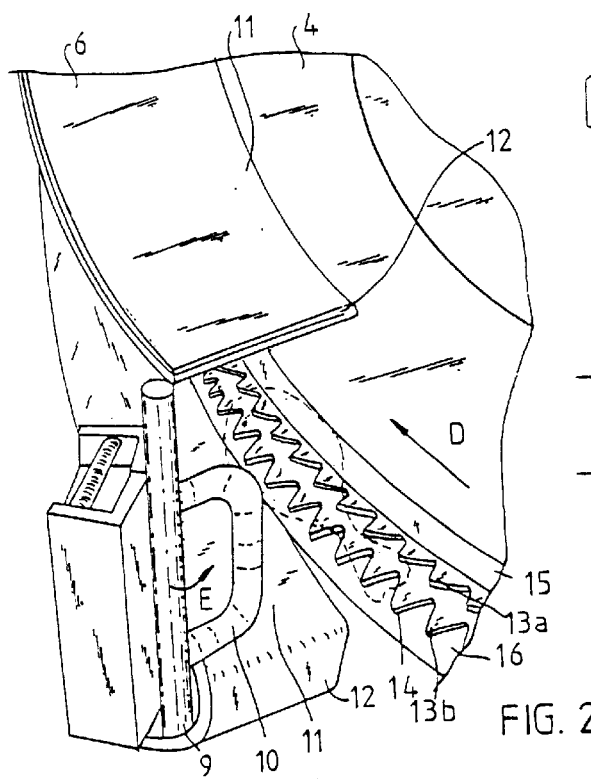
FIG. 2 shows a detail of the device of FIG. 1, at the location of the placement track.

The circumference of the disc 4 is largely screened off by hoods 6 and 7, and in between, at the bottom side, by guiding rods 26. Thus the circumference of the disc 4 can only be reached by hand at the location of the placement track situated above. The hoods 6 and 7 form some kind of tunnel passage. As can be seen in FIG. 2 the hood 6 (just like hood 7) also offers a sideward screening by means of depending walls 11. The walls 11 have bent edges 12 for promoting the entering of the leg parts placed on the toothed profile 5.

At the location of the entrance opening a bracket 10 has been arranged, which extends amply next to the toothed profile 5, in order to let the leg parts pass unimpededly but not the hand of workman. Said hand will then touch the bracket 10, as a result of which it will rotate about the pin 9 in the direction E, as a result of which the circuit for the electro motor for the disc 4 is interrupted.

At the downstream side, the hood 6 extends to the skinning station 20, in which within a cage 18 a number of vertically positioned profiled skinning rollers 19—known per se—(see FIG. 3) have been arranged. These rollers are driven in directions F and G, by means of driving means that are not shown.

Downstream of the skinning station 20 guiding rods 26 are situated, which end near the cutting station 21, further shown in FIGS. 4A and 4B. By means of motor 22 a shaft 23 is driven, on which two circular knives 24 and 25 have been arranged. The knives 24 and 25 are driven in a direction opposite to D. The knives are positioned such that they extend into the slots 31a,b, which have been formed at the circumference of the disc 4, on either side of the toothed profile 5 (also see FIG. 5A—lines S indicate the knives). The mutual distance of the knives 24, 25 can be changed by detaching the bush 33 from the shaft 23 (by means of the little screw shown), removing the knife 24, and replacing the intermediate ring or spacer ring 34 situated on the shaft 23, by another ring of the desired length.

In FIG. 4C another possibility is shown for altering the distance between the knives. The knives 124, 125 are each mounted on their own driving shaft 123a, 123b, that are driven by motors 122a and 122b, respectively. One of the motors or both motors can be moved in the direction J, and be secured in the new position after that.

Immediately downstream a flap 29 has been arranged on the frame, which flap forms a unity with shaft 28 which can freely tilt in the direction H. The flap 29 is provided with slots 30, in order to be swung if necessary without impediments from the safety brackets 27.

In the FIGS. 5 and 5A the disc 4 is shown again and more clearly. At the circumference there are to edges 1 5 and 16, which bound the aforementioned slots 31a, 31b. In the centre of the circumference there is an elevation with a canal, in which the toothed profile 5 is permanently fixed. The toothed profile 5 is made of stainless steel and is substantially U-shaped. The lower portion of the U-legs runs straight upwards from the bottom 17, but both toothed upper portions 13a, 13b are bent away from each other.

In use the workman takes a leg part in his hand, here a thighbone P of a chicken, and takes it to the exposed portion of the disc 4. The thighbones P are then placed on the toothed profile 5 with their thick portion in the lead and the teeth hold the thighbone fixed in its place in sideward direction, in circumferential direction and, as a result of the inclined position of the teeth, in radial outward direction as well. The disc 4 is rotated in the direction D, and thus the thighbone on the toothed profile 5 is taken along in the direction D. The thighbone then enters the tunnel, formed by the hood 6. When the workman takes too long placing the thighbone, his hand, when arriving at the hood 6, will touch the bracket 10, which will then tilt, after which the rotation of the disc 4 is immediately stopped. To that end a suitable stop/braking mechanism has been provided.

After a quarter of a circulation, the thighbone P ends up in the more or less vertical track of the circle at the back (see FIG. 1) of the device 1, where the skinning station 20 is situated. During the transport past the skinning rollers 19, which takes place in downward direction, the skin is stripped from the meat of the thighbone as a result of friction by the profiled rollers 19. The entire skin is stripped here, in which it should be noted that no skin will be present at the side where the thighbone is engaged by the toothed portions 13a, 13b, because at that location it was connected to the rest of the chicken. The stripped skin falls down in the direction A and is collected in a tray for that purpose—which is not shown—.

The thus skinned thighbone is then conveyed further by the toothed profile in the direction D, in which the guiding rods 26 also confine the thighbone in radial outward direction, so that, despite the fact that the transport takes place at the lower side of the disc 4, the thighbone nonetheless arrives well-positioned at the next station, the cutting station 21. There, two incisions are made with the help of the circular knives 24 and 25 along the bone of the thighbone (also see FIG. 6). The cut-off parts of the thighbone fall in the direction I, and touch flap 29, which can tilt away in the direction H. The moveable flap 29 ensures that the cut-off thighbone parts fall down in the direction B at the wanted location (see FIG. 1) in order to be collected in a tray as well.

The inner portion of the thighbone, containing the bone, is transported further by the toothed profile 5 to the last quarter of the disc 4, within the hood 7, until the bone portion arrives at an opening 8 in the hood 7. At the downstream end of the opening 8, at the inner surface of the hood 7, a protrusion or scraper 32 is situated which extends in an inclined manner from the inner surface of the hood 7 to the toothed profile and with which the bone portions are lifted from the teeth. The bone portions then fall through the opening 8 in the direction C in order to be collected in a tray—which is not shown—.

The disc 4 then rotates further in direction D in order to arrive again in the area where the placing of the thighbones takes place.

What is claimed is:

1. A device for skinning and cutting leg parts of poultry with each leg part provided with a bone and meat extending laterally from the bone, comprising a frame, a revolving conveyor.

said revolving conveyor having a toothed profile with a double row of teeth for conveying said leg parts in sequence along an arcuate processing path with the bones of said leg parts extending parallel to the processing path and positioned between the rows of said teeth, means arranged on said frame for skinning the leg parts as the leg parts are conveyed along the processing path, cutting means arranged on said frame for cutting through the leg parts along the bones as the leg parts are conveyed along the processing path, said cutting means comprising two knives arranged for cutting through the leg part along the bone, on opposing sides of said toothed profile;

so that the bones of the leg parts and teeth of the revolving conveyor pass between the cutting means and the cutting means cuts the meat extending laterally from the bone.

2. A device according to claim 1, wherein said toothed profile is driven in a revolving path and is selected from the group consisting of a toothed endless belt and a toothed ring.

3. A device according to claim 1, in which said double row of teeth comprises a toothed ring or toothed endless belt.

4. A device according to claim 3, in which the teeth of both rows of teeth are inclined away from each other.

5. A device according to claim 2, in which the revolving path is substantially situated in a vertical plane.

6. A device according to claim 5, in which at least over a part of the circumference of the toothed ring or toothed belt a hood is arranged, which forms a tunnel for the leg part.

7. A device according to claim 5, wherein said means for cutting through the leg part is situated at a bottom of the device.

8. A device according to claim 7, in which downstream of the cutting means a retaining means is arranged for converting a horizontal ejection direction of the cut-off pieces of meat into a falling direction.

9. A device according to claim 7, in which the skinning means are situated above the cutting means and below a placement track.

10. A device according to claim 5, in which the toothed ring or toothed belt follows a substantially circular path.

11. A device according to claim 1, in which the knives are arranged for adjustment of their distance one to the other in a direction transverse to the movement path of the leg parts.

12. A device according to claim 11, in which the knives are arranged on their own motor, in which the mutual distance between the motors can be adjusted.

13. A device according to claim 1, furthermore provided with means for guiding the bone after cutting to or into the direction of a location of discharge at a distance from the cutting means.

14. A device according to claim 1, wherein the device is arranged and configured for skinning and cutting thighbones.

15. A device for skinning and cutting poultry leg parts provided with a bone, comprising a frame and means arranged on the frame for skinning the leg part, as well as means arranged on the frame for cutting through the leg part along the bone, wherein the device furthermore comprises means for conveying the leg part past the skinning means and after that past the cutting means, said conveying means comprising a toothed revolving driven endless belt or ring which is provided with a double row of teeth, slots being arranged on either side of said double row of teeth, wherein the cutting means comprise two knives arranged for cutting along said double row of teeth while extending into said slots for cutting through the leg part along the bone, on opposing sides thereof.

16. A device for skinning and cutting poultry leg parts provided with a bone and meat extending laterally from the bone and a skinless surface and a skin covered surface, comprising;

a frame, means arranged on said frame for skinning the leg part, cutting discs arranged on the frame for cutting through the meat of the leg part along opposite sides of the bone, conveyor means for conveying the leg part in a circular path past said skinning means and after that past said cutting means, said conveyor means comprising a toothed revolving driven endless belt or ring which is provided with a double row of teeth for engaging the skinless surface of the leg part with the skin-covered portion of the leg part facing away from the conveyor means, said cutting discs straddling said double row of teeth, and the teeth of both rows of teeth are inclined and bent to face away from each other in opposite directions to straddle the bone of the leg part to engage the meat extending laterally from the bone of the leg part and resist radial, lateral and circumferential movement of the leg parts with respect to the conveyor means.

17. A device according to claim 16, wherein the teeth are inclined in a plane perpendicular to the direction of conveying.

18. A device for skinning and cutting poultry leg parts provided with a bone, comprising a frame and means arranged on the frame for skinning the leg part, as well as means arranged on the frame for cutting through the leg part along the bone, wherein the device furthermore comprises means for conveying the leg part past the skinning means and after that past the cutting means, said conveying means comprising a toothed revolving driven endless belt or ring which is provided with a double row of teeth, wherein the teeth of both rows of teeth are inclined and bent to face away from each other in opposite directions, and slots being arranged on both sides of said double row of teeth, wherein the cutting means comprise two knives arranged for cutting along said double row of teeth while extending into said slots, for cutting through the leg part along the bone, on opposing sides thereof.

19. A device for skinning and cutting leg parts of poultry, with each leg part including an elongated bone and meat surrounding the bone, comprising:

a frame;

a toothed profile rotatably mounted on said frame for conveying leg parts in sequence along a circular processing path with the bones of the leg parts oriented parallel to the processing path, skinning means mounted on said frame at and parallel to the processing path configured for removing the skin of the poultry parts as the poultry parts move with said toothed profile along the circular processing path past said skinning means, cutting discs mounted on said frame at a position past said skinning means along the circular processing path for cutting through the poultry parts on opposite sides of and substantially parallel to the bone in each poultry part as the poultry parts move with said toothed profile along the circular processing path past the cutting discs, said cutting discs straddling said toothed profile, and guide rods extending between said skinning means and said cutting discs for guiding the poultry parts along the circular processing path from said skinning means to said cutting discs.

20. A device for skinning and cutting leg parts of poultry, with each leg part including an elongated bone and meat surrounding the bone and an uncovered portion of the meat that has no skin and a skin-covered portion of the meat that has skin, comprising:

a frame;

a revolving conveyor movably mounted on said frame for the conveying leg parts in sequence along a circular processing path with the bones of the leg parts oriented parallel to the processing path, said conveyor having meat engaging elements for engaging the uncovered portion of the meat of the leg parts and straddling the bones of the leg parts with the skin-covered portion of the meat facing away from said conveyor, for carrying the leg parts along the circular processing path, skinning means mounted on said frame at and parallel to the processing path configured for engaging the skin-covered portion of the meat of the leg parts facing away from the conveyor and removing the skin on the skin-covered portion of the meat of the leg parts as the leg parts move with said conveyor along the circular processing path past said skinning means, cutting discs mounted on said frame at a position past said skinning means along the circular processing path for cutting through the meat of the leg parts on opposite sides of and substantially parallel to the bone in each leg part as the leg parts move with said conveyor along the circular processing path past the cutting discs, and said cutting discs straddling said meat engaging elements so that the portions of the meat of the leg parts about the bones of the leg parts can continue to be moved by said conveyor after the leg parts have been skinned and cut.

* * * * *